Dec. 2, 1969 A. G. PICKIOS 3,481,452

DRAFTSMAN KIT

Filed Dec. 11, 1967 9 Sheets-Sheet 1

INVENTOR
ANTHONY G. PICKIOS
BY Bertram Frank
ATTORNEY

Dec. 2, 1969 A. G. PICKIOS 3,481,452

DRAFTSMAN KIT

Filed Dec. 11, 1967 9 Sheets-Sheet 2

INVENTOR
ANTHONY G. PICKIOS
BY Bertram Frank
ATTORNEY

Dec. 2, 1969 A. G. PICKIOS 3,481,452

DRAFTSMAN KIT

Filed Dec. 11, 1967 9 Sheets-Sheet 3

INVENTOR
ANTHONY G. PICKIOS
BY Bertram Frank
ATTORNEY

Dec. 2, 1969 A. G. PICKIOS 3,481,452

DRAFTSMAN KIT

Filed Dec. 11, 1967 9 Sheets-Sheet 4

INVENTOR
ANTHONY G. PICKIOS
BY Bertram Frank
ATTORNEY

INVENTOR
ANTHONY G. PICKIOS
BY Bertram Frank
ATTORNEY

Dec. 2, 1969 A. G. PICKIOS 3,481,452

DRAFTSMAN KIT

Filed Dec. 11, 1967 9 Sheets-Sheet 6

INVENTOR
ANTHONY G. PICKIOS
BY Bertrand Frank
ATTORNEY

INVENTOR
ANTHONY G. PICKIOS
BY Bertram Frank
ATTORNEY

Dec. 2, 1969 A. G. PICKIOS 3,481,452

DRAFTSMAN KIT

Filed Dec. 11, 1967 9 Sheets-Sheet 8

INVENTOR
ANTHONY G. PICKIOS
BY Bertram Frank
ATTORNEY

Dec. 2, 1969 A. G. PICKIOS 3,481,452

DRAFTSMAN KIT

Filed Dec. 11, 1967 9 Sheets-Sheet 9

INVENTOR
ANTHONY G. PICKIOS
BY Buttram Frank
ATTORNEY

United States Patent Office 3,481,452

Patented Dec. 2, 1969

3,481,452

DRAFTSMAN KIT

Anthony G. Pickios, 140—18 Burden Crescent, Jamaica, N.Y. 11435

Filed Dec. 11, 1967, Ser. No. 689,406
Int. Cl. B65d *85/54;* A47b *63/04*
U.S. Cl. 206—16 10 Claims

ABSTRACT OF THE DISCLOSURE

Present invention relates to an artist draftsman valet which comprises a frame means having a lower and raised portion. The lower portion of the frame means has provided thereon in relatively fixed positions pencil sharpening devices, sponge receptacle, scratch pads, places for pen and pencils and other appropriate drafting implements, utility boxes and pen holders.

Heretofore in prior art it has been known that many draftsmen during the course of their working day, as well as artists, lose a great amount of working time because of their inability to locate necessary working tools for their profession. Drafting instruments are generally kept off the drafting board and the draftsman when in need of a particular instrument must turn away from the board to reach for the same. Time and concentration are lost as well as a physical stress placed on the draftsman because this may be repeated many times during the course of a working day. Of necessity the drafting board is generally covered by the work to be done which leaves little room for organizing his instruments necessary for the draftsman during the course of his work. The continual reaching and time lost in trying to locate these various implements have contributed greatly to the delay in preparation of many of the draftman's necessary work.

It is one object of the present invention to avoid and overcome the foregoing difficulties by providing a kit which has all the necessary instruments used by the draftsman held in a readily available position.

Another object of the present invention is to provide a kit which will permit the draftsman to have all of his drafting implements readily available and in position so that they may be used without hesitation.

Yet a further object of the present invention is to provide an instrument organizer which will hold all necessary drafting implements in position so that the draftsman may repair or increase the use of the various drafting instruments as well as making necessary notations during the course of his work.

The objects of the present invention and other objects which will become apparent as the description proceeds are achieved by providing a kit for artists and draftsman comprising a frame means having a raised portion and a lower portion, said raised portion having disposed thereon at least a calendar, a pencil sharpening device disposed on the said lower portion of said frame means, a scratch pad also disposed in space relationship, a sponge means disposed on said lower portion in spaced relations to said pencil sharpening device and said scratch pad to provide a pre-arranged sweep path for the operation to sharpen, cleanse and dull the point of a drafting implement, and a means for containing drawing pencils and the like in an appropriate position and readily available to the draftsman.

For a better understanding of the present invention reference should be had to the accompanying drawings wherein like numerals of reference indicate similar parts throughout the receptive views and wherein.

Figure 3:
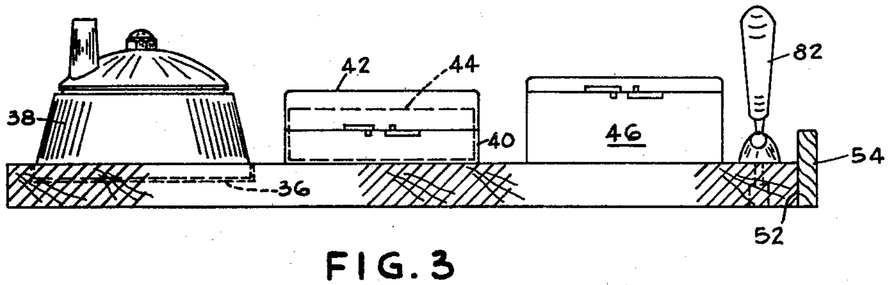
Figure 4:
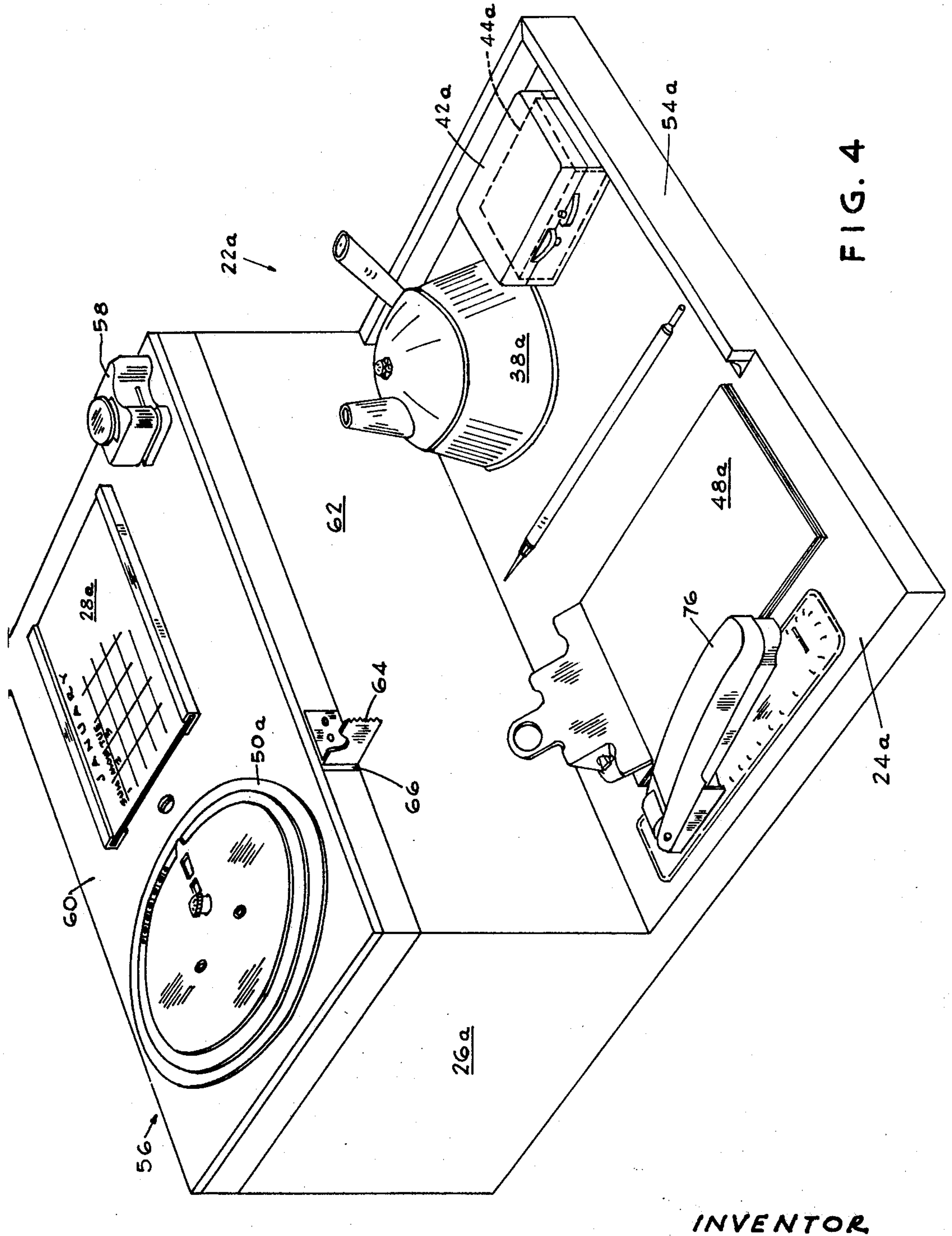
Figure 5:
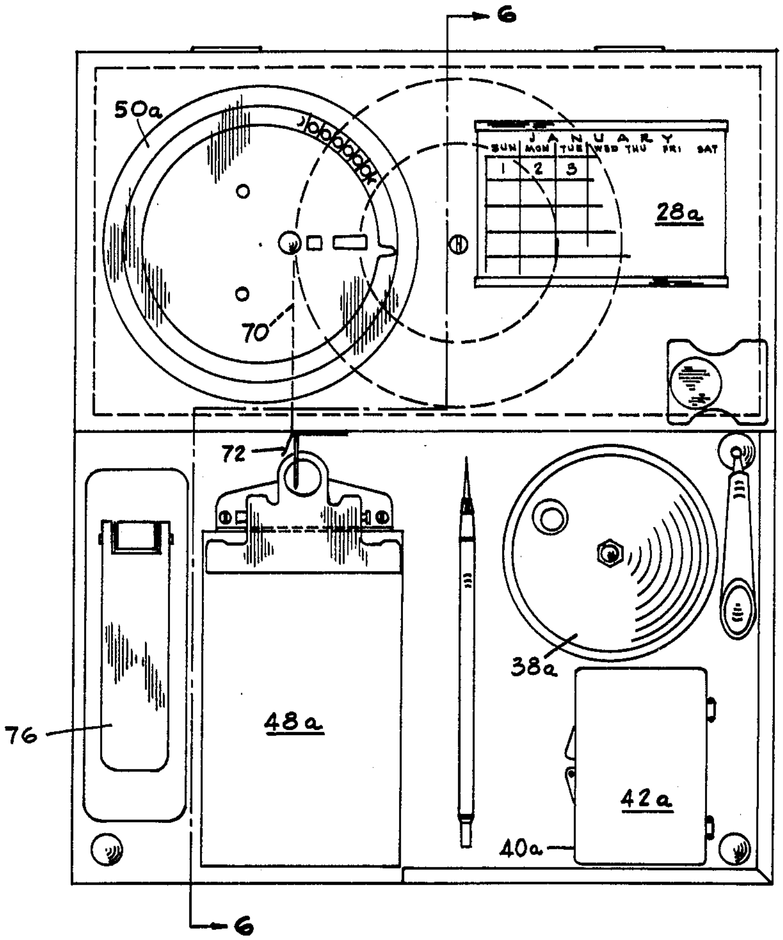
Figure 6:
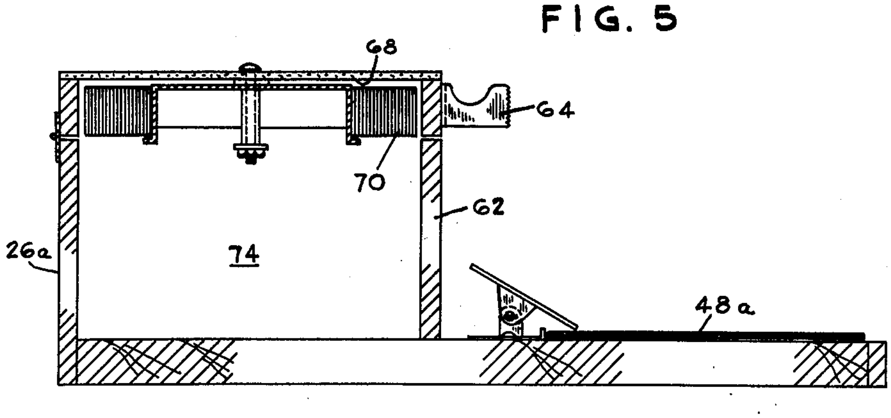
Figures 7, 8:
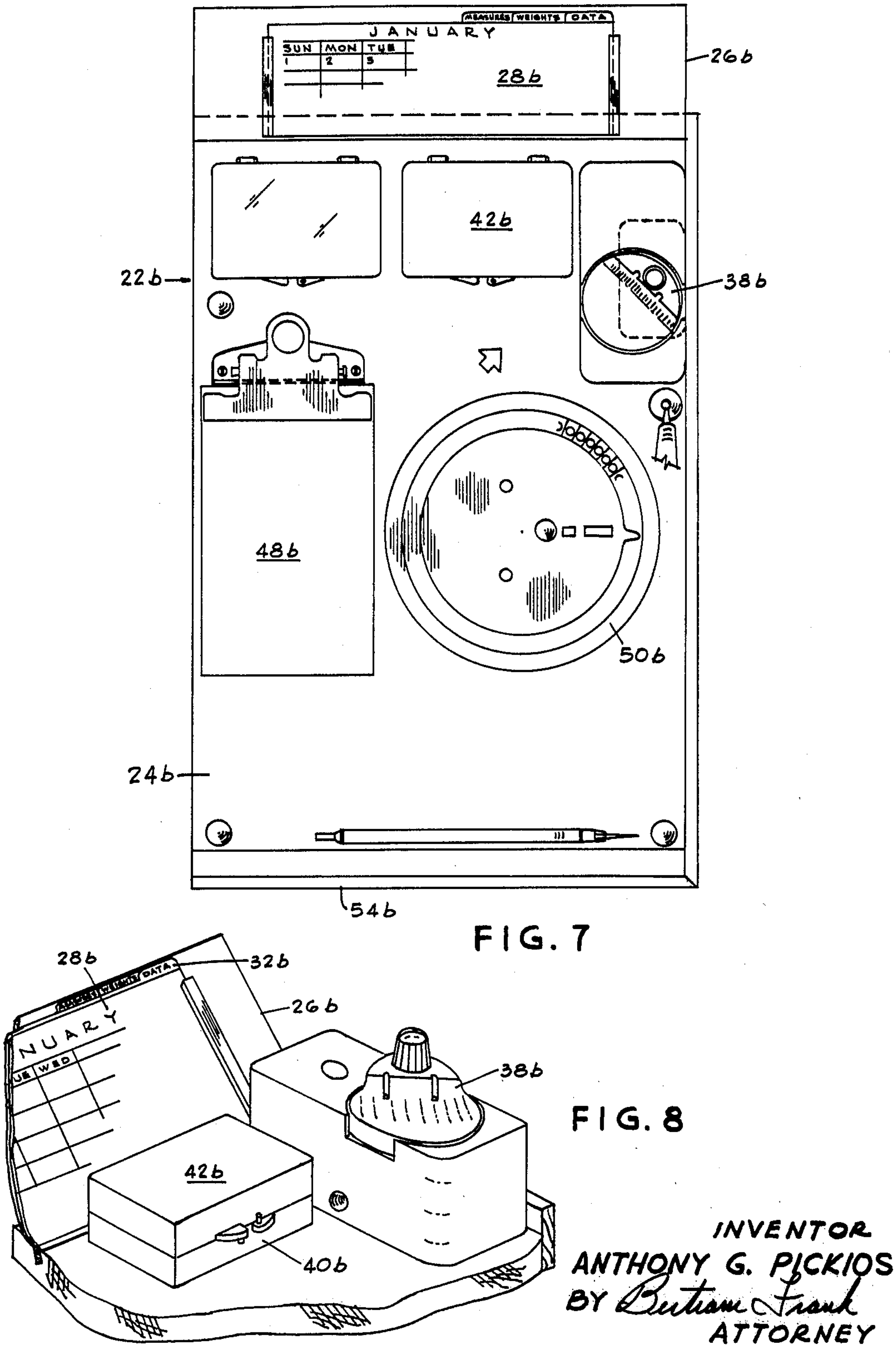
Figure 9:
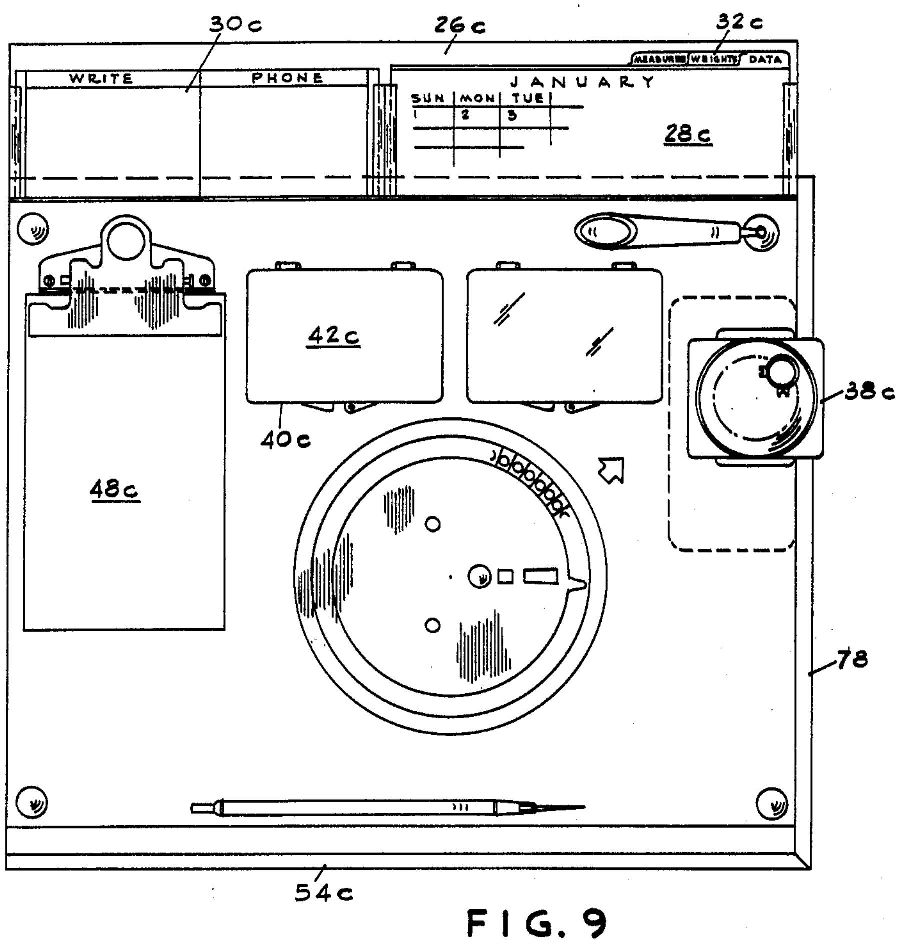
Figure 10:
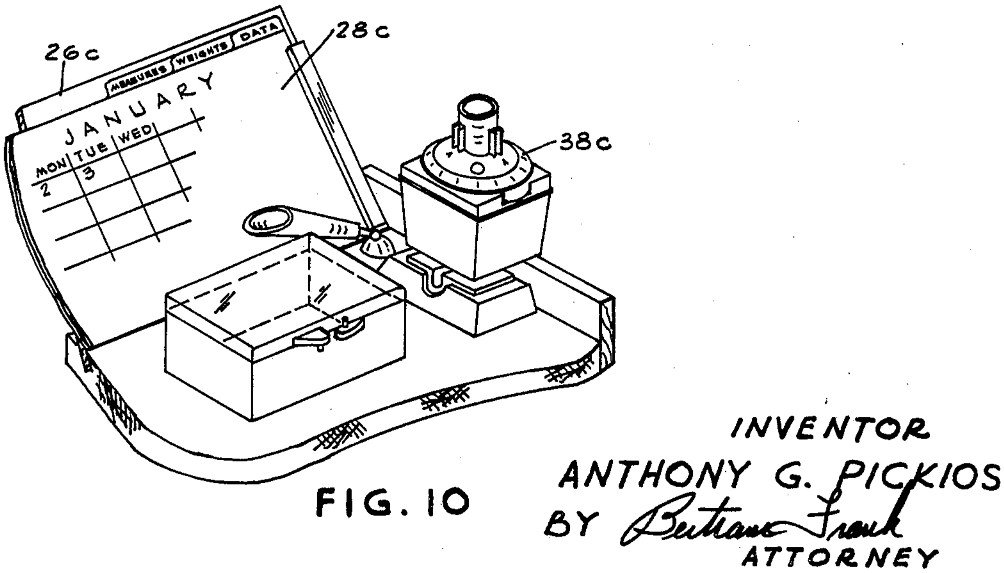
Figures 11, 12:
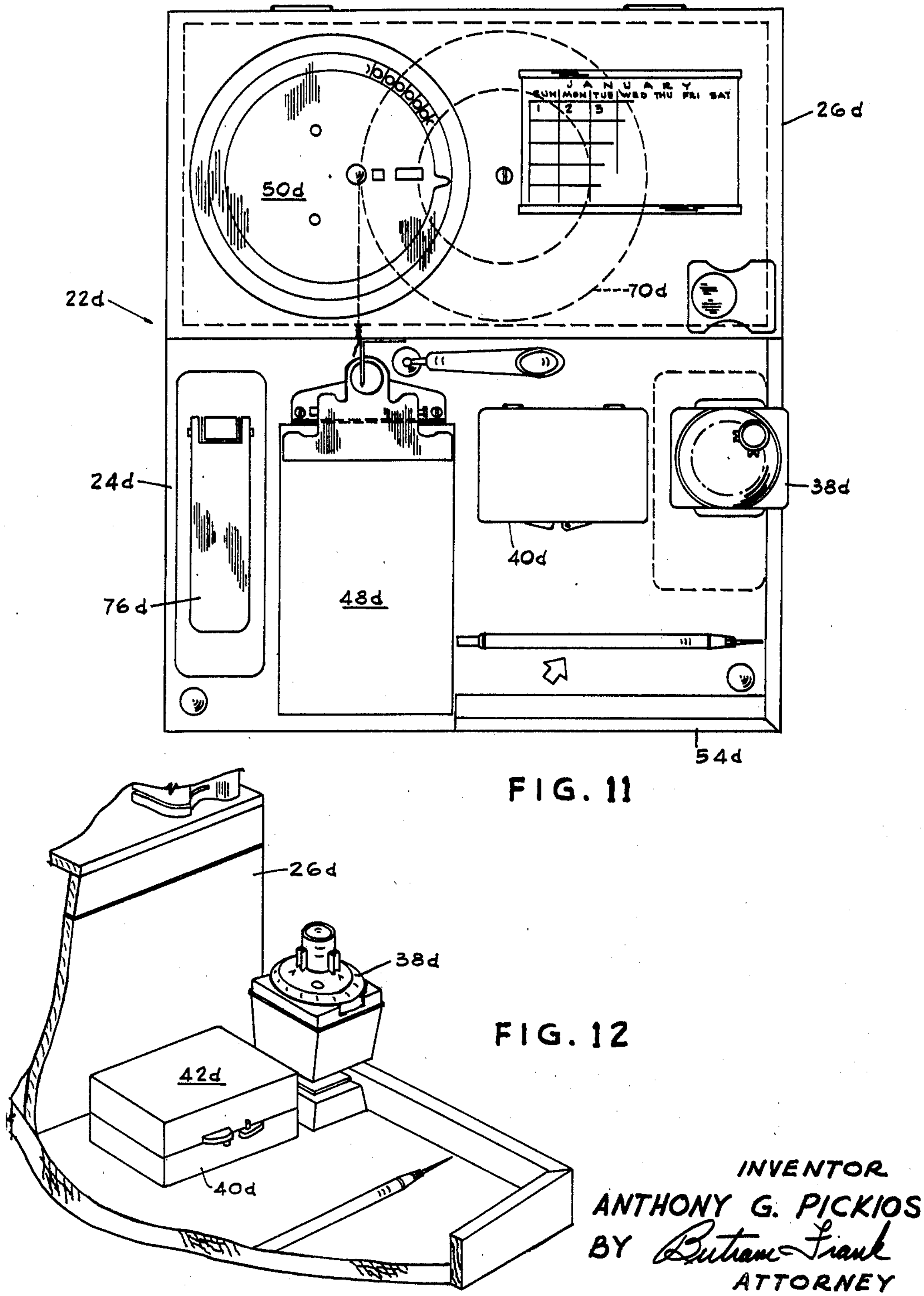
Figure 13:
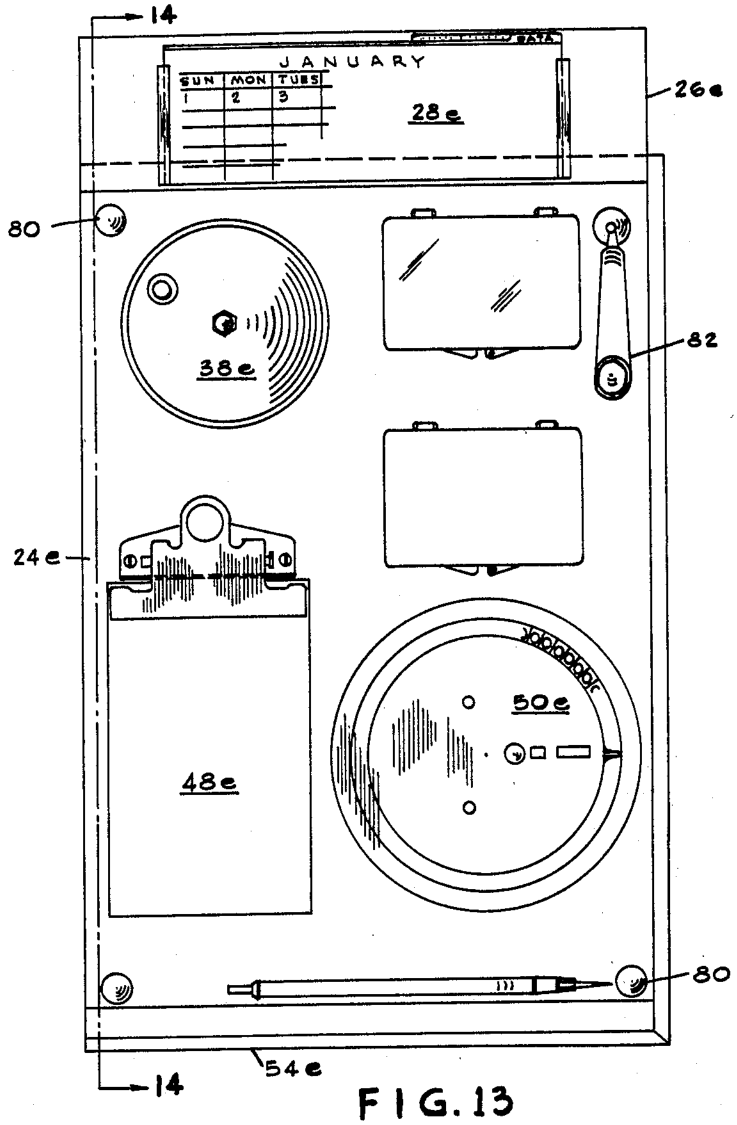
Figure 14:
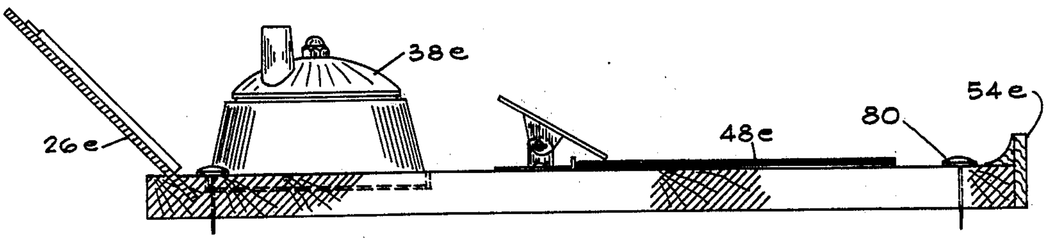
Figure 15:
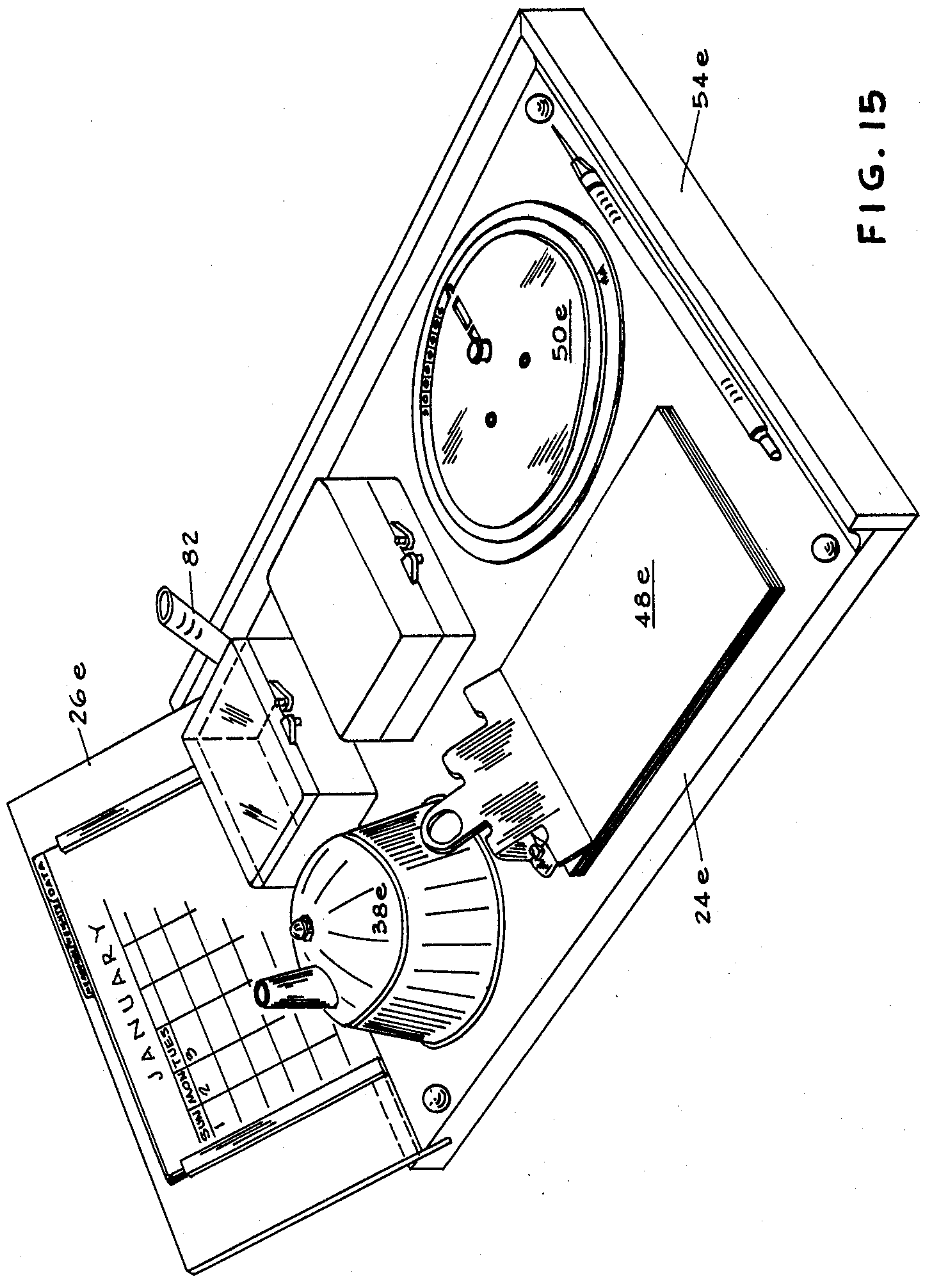

FIGURE 3 is a front elevational view of the lower portion of the housing of the frame means, FIGURE 4 is a perspective view of an alternative embodiment of the present invention, FIGURE 5 is a plan view of the alternative embodiment shown in FIGURE 4, FIGURE 6 is a cross sectional view of the alternative embodiment shown in FIGURES 4 and 5, FIGURE 7 is a plan view of a further alternative embodiment, FIGURE 8 is a partial perspective view of a portion of the further alternative embodiment shown in FIGURE 7, FIGURE 9 is a plan view of yet another alternative embodiment, FIGURE 10 is a partial perspective view of the alternative embodiment shown in FIGURE 9, FIGURE 11 is a plan view of yet another alternative embodiment, FIGURE 12 is a partial perspective view of the device shown in FIGURE 11, FIGURE 13 is a plan view of a further alternative embodiment, FIGURE 14 is a cross sectional view taken along lines 14—14 of FIGURES 13, and FIGURE 15 is a perspective view of the device shown in FIGURES 13 and 14.

Although the principals of the present invention may be broadly applicable to many different areas it is particular understood that the present invention is limited to the use in conjunction with artists and draftsmens' implements and their facility for being reached.

Figure 1:
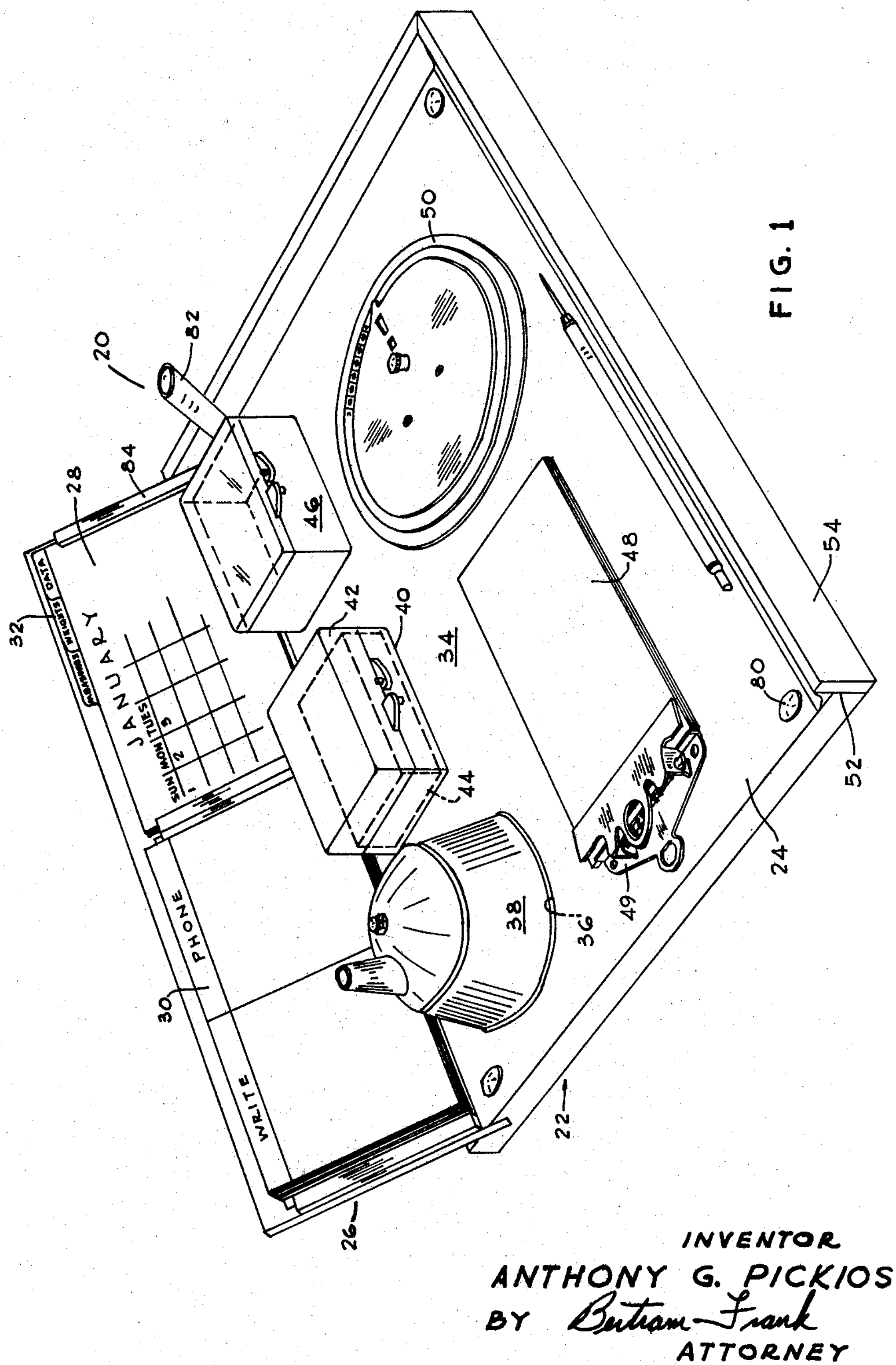
FIGURE 1 is a perspective view of the present invention.

Referring now to FIGURE 1 a kit is generally indicated by the reference numeral 20. A frame means 22 may be provided having a lower portion 24 and a raised portion 26. The raised portion 26 may take several different forms, for example as shown in FIGURE 1 the raised member is an angularly disposed board adapted to support a calendar 28, telephone writing pad 30, and data cards 32 which may be appropriately disposed or retained behind the calendar 28.

The raised portion 26 may take other forms as shown in the alternative embodiments, however, it should be particularly understood that the form of the raised portion 26 is only referred to as a convenience for the disposition of various drafting aids and implements.

The lower portion of the frame means may be provided with a flat surface 34 upon which various types of drafting aids and implements may be mounted. Although the aids and instruments may not be fixedly mounted, it is particularly understood that they may be removably disposed on the lower portion 24 of the frame means 22 in the convenient depression 36 (shown by way of example in connection with the pencil sharpener 38 in FIGURE 3) as is most convenient for the user. It is contemplated however that the pencil sharpening device 38 should be fixed in position on the lower portion 24 of the frame means 22.

Referring again to FIGURE 1, the lower portion 24 of the frame means 22 has disposed thereon a pencil sharpening device 38 which should be fixed in position on the lower portion 24 of the frame means 22.

Referring again to FIGURE 1, the lower portion 24 of the frame means 22 has disposed thereon a pencil sharpening device 38 conveniently located on the lower portion. A plurality of boxes or containers 40 having removable or openable tops 42 are also disposed on the lower portion 24 and in convenient working relationship to the pencil sharpening device 38. For example a box 40 may be provided with sponge or foam material 44 disposed therein so that after the draftsman sharpens his pencil and must wipe the point clean of any free graphite he may wipe the same point on the sponge material 44 in the box 40 containing the same. In spaced relationship to the sponge containing box 40 a utility box 46 may be located. The utility box 46 may be a recipient of various items such as paper clips, rubber bands, new points and the like small implements.

Also disposed on the lower portion 24 the draftsman may require a note pad 48 be readily available to him for making notes during his drafting procedures, however, its primary function may be to dull the pencil point previously sharpened to the degree whereby fine lines may be created by the draftsman or artist. In order to maintain the note pad or scratch pad 48 in position on the lower portion 24 a holding means 49 may be provided which will releasably secure the pad 48 to the frame means 22.

In order for the draftsman to make convenient and quick conversions of the numerical fractions, such as half inch, quarter inch measurements, etc., to whole numbers, a fractional calculator 50 may also be provided on the lower portion 24 of the frame means 22.

The frame means 22 may be provided with a retaining curb 54 disposed on the lower edge 52 of the lower portion 24, said retaining curb 54 may be provided to retain the drafting pencils and other loose implements normally associated with drafting procedures.

Figure 2:
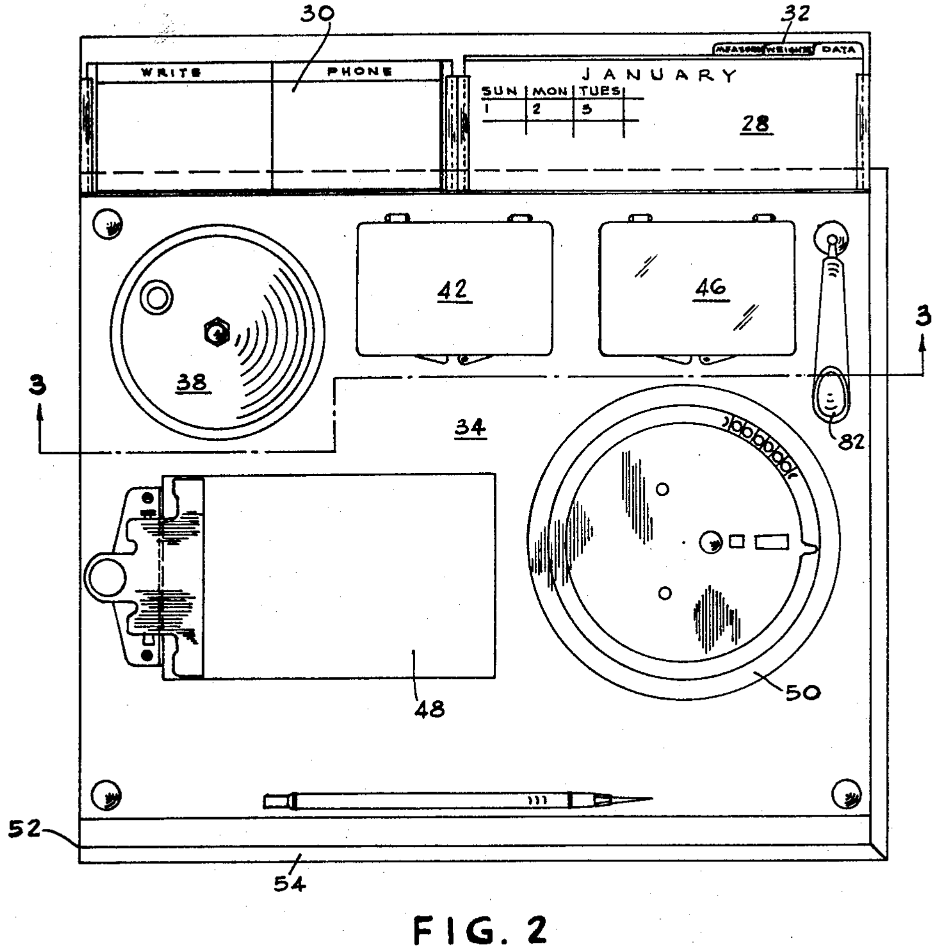
FIGURE 2 is a plan view of the present invention.

Referring now to FIGURE 2, the plan view readily shows the spacial disposition of the various drafting aids and their convenient location. For example, during the course of the drafting procedures it may be necessary for the draftsman to perform certain calculations to conform his drawings to the physical implement that he is copying or to dimension the drawing he is making. The scratch pad or the note pad 48 conveniently located on the lower portion 24 of the frame means 22 will provide readily accessable writing room and an easy position for the location for these notes.

As previously indicated a systematic physical movement generally takes place for the sharpening of an artists pencil whether this form may take shape while individually sharpening or through a convenient sharpening mechanism the procedure generally taken is as follows: the sharpening, the wiping (or cleansing) of the point and then a dulling step is used so that the pencil in this particular case is readily available to perform the function for which it is to be used. The positioning of the pencil sharpening device 38, the sponge material 44 in the box 40 and the note pad 48 is so made that one sweeping motion by the draftsman may be made to completely follow the steps above indicated.

Referring to the alternative embodiment shown in FIGURES 4 through 6 a more deluxe model of the kit is disclosed. Here the raised portion **26*a* in the form of a box or receptacle 56 is designed to contain the fractional calculating device 50*a*, a calendar 28*a* and hole punch machine 58 all disposed on the lid 60 of the box or receptacle 56. On the vertical wall 62 a tape cutting knife 64 may be provided adjacent a slot 66 in the wall 62. All of these devices are in convenient reach of the draftsman and having a functional relationship desirable and needed by the majority of draftsmen. The underside 68 of the lid 60 may be adapted to rotatably hold in any convenient manner a roll of tape 70 such that the free end 72 of the tape 70 may be fed through the slot 66 in the vertical wall 62. In this manner tape 70 may be drawn through the slot 66 and cut on the tape cutting knife 64**, at the convenience of the draftsman.

The internal area 74 of the box 56 may be adapted to hold data, color cards or color chips or any other material required to be stored or necessarily required by the draftsman.

The lower portion **24*a* of the frame means 22*a* may be provided with the pencil sharpener 38*a*, sponge material 44*a* in a box 40*a* and note pad 48*a* again in the previously described positions so that the pencil may be sharpened, wiped and dulled in one sweeping motion. Here, however, a staple machine 76 may be provided in a convenient place near the note pad 48*a***.

Since the majority of drafting boards (not shown) are inclined for the convenience of the draftsman, the lower portion **24*a* of the kit 20*a* may be provided with a retaining curb 54*a* which is provided to maintain loosely held pencils and the like against rolling off the lower portion 24*a***.

Another alternative embodiment, as shown in FIGURES 7 and 8 provide basically the same elements on a frame means **22*b* as shown in the preferred embodiment of FIGURES 1, 2, and 3. However, in this case the pencil sharpening device 38*b* may be clamped to the side edge of the lower portion 24*b* of frame means 22*b*. The raised portion 26*b* may be provided with a calendar 28*b*** and provisions are made behind the calendar for storing data cards and the like so that they are readily available for use.

It may be recognised that this particular frame means **22*b* is longer and narrower than the embodiments previously described, however it should be further noted that the pencil sharpening device 38*b*, sponge retaining box 40*b* are in position to permit the sweeping motion of sharpening, cleansing and dulling previously indicated. In this embodiment the pencil sharpening device 38*b* is shown on the right hand side of lower portion 24*b*. Here again, the position of this element may be changed at the convenience of the draftsman but the sharpener should be fixed in position at the lower portion 24*b***.

FIGURES 9 and 10 disclose yet a further arrangement or embodiment. Referring particularly to FIGURE 9, the raised portion **26*c* is provided with a writing pad 30*c* for telephone numbers as well as a calendar 28*c*. As previously described in all other embodiments the note pad 48*c*, sponge containing box 40*c* and pencil sharpening device 38*c*** are provided in sequential order to perform the sharpening, cleaning and dulling operation.

It should be noted that as shown in FIGURE 10, the pencil sharpening device **38*c* is clamped to the lower portion 24*c* which in this case is shown on the right hand side of the lower portion 24*c*. However, left hand mounting may be provided when desired. Further a retaining member 78 may be provided on the entire or partial length of the lower portion 24*c* and is correctable to the side of the lower portion 24*c*** as shown in FIGURES 9 and 10.

At the lower edge 52 of the frame means **22*c* there is provided a retaining curb 54*c*** the purpose of which has been treated earlier.

Turning now to FIGURES 11 and 12, the deluxe model discussed in FIGURES 4 and 6 is provided with a pencil sharpening device **38*d* which is clamped to the lower portion 24*d* of the frame means 22*d***.

FIGURES 13, 14 and 15 disclose yet another arrangement of elements on a long narrow lower portion **24*e***.

In each of the various embodiments shown, tacks or other convenient fastening means 80 may be provided to hold the kit in position on the drafting table or board (not shown). Similarly a pen holding means 82 may be provided on the lower portions, as shown, or on the raised portions, in a convenient position. Greater flexibility is found in the disposition of the pen holding means 82, than in the other elements.

In each instance of the preferred and alternative embodiments channel guide members 84 are used to slidingly support either the calendar elements or the data cards, as respectively shown, so that the cards and the like information may be readily inserted or removed from their supported positions.

In summary it will be recognized by those skilled in the art, based on the above disclosure, that the object of space and time saving, neatness and efficiency of operation have been accomplished through the disposition of the necessary drafting and artists tools in a well organized manner in one complete kit.

In accordance with the patent statutes a preferred and alternative embodiment have been shown and described in detail, however it should be particularly understood that the invention is not limited thereto or thereby.

I claim:

1. A draftman's kit removably connectable to a drafting table comprising in combination a frame means; said frame means being provided with a lower portion and an upper portion; said upper portion being provided with an area viewable by the user of the draftman's kit; a pencil sharpening device disposed on said lower portion; at least one container disposed on said lower portion and in spaced relationship to said pencil sharpening device; a sponge material positioned in said at least one container; a scratch pad disposed on said lower portion in spaced relationship to said pencil sharpening device and said at least one container; and means provided for releasably securing said draftman's kit to the drafting table; said pencil sharpening device, sponge material and scratch pad being so positioned to permit the user to sharpen, clean and dull the point of a drafting tool.

2. A draftman's kit according to claim 1 where said lower portion of said frame means has a lower edge, said lower portion being provided with a retaining curb to prevent the rolling off of drafting tools; a calendar releasably connectable to said area; a fractional calculator disposed on said lower portion for converting integers to decimals; and a telephone writing pad disposed on said upper portion.

3. A draftman's kit according to claim 1 wherein said upper portion is comprised of a box having a removable lid; a vertical wall forming a portion of said upper portion facing said lower portion having a slot therein; a tape cutting knife disposed on said vertical wall adjacent said slot; a factional calculator disposed to said viewable area; a calendar disposed on said upper portion; a hole punched fixedly positioned on said upper portion; said box having a hollow storage area therein, and a roll of tape rotatably disposed within said box and having the tape removable through said slot.

4. A draftman's kit according to claim 3 wherein said lower portion is provided with a staple machine thereon; said lower portion being provided with a retaining curb at its lower edge.

5. A draftman's kit according to claim 1 wherein said pencil sharpening device is mounted on a holding member; said holding member being connectable to said lower portion; said upper portion being comprised of an inclined member having a calendar disposed thereon.

6. A draftman's kit according to claim 5 wherein a fraction calculator is disposed on said lower portion, and said upper portion being provided with a telephone pad disposed thereon.

7. A draftman's kit according to claim 3 wherein said pencil sharpening device is clamped to said lower portion.

8. A draftman's kit according to claim 1 wherein said upper portion is in the form of a rearwardly inclined board.

9. A draftman's kit according to claim 1 wherein a pen holder is connected to said frame means.

10. A draftman's kit according to claim 1 wherein a tape knife is disposed thereon, a roll of tape rotatably disposed on said upper portion and being remotely spaced from said tape knife, said tape knife adapted to cut lengths of tape removed from said tape roll.

References Cited

UNITED STATES PATENTS

| | | | |
|---|---|---|---|
| 361,847 | 4/1887 | Tannatt | 206—17.1 |
| 398,669 | 2/1889 | Starkey | 312—231 |
| 1,086,735 | 2/1914 | Spaulding | 206—16 |
| 2,105,163 | 1/1938 | Scandore | 206—17.1 |
| 2,196,863 | 4/1940 | Hassenfeld | 312—231 X |
| 2,657,669 | 11/1953 | Roger | 206—67 X |

CASMIR A. NUNBERG, Primary Examiner

U.S. Cl. X.R.

206—17.1; 312—231